(12) United States Patent
Lundquist

(10) Patent No.: US 7,842,920 B2
(45) Date of Patent: Nov. 30, 2010

(54) METHODS AND SYSTEMS OF PERFORMING DEVICE FAILURE ANALYSIS, ELECTRICAL CHARACTERIZATION AND PHYSICAL CHARACTERIZATION

(75) Inventor: Theodore R. Lundquist, Milpitas, CA (US)

(73) Assignee: DCG Systems, Inc., Fremont, CA (US)

( * ) Notice: Subject to any disclaimer, the term of this patent is extended or adjusted under 35 U.S.C. 154(b) by 334 days.

(21) Appl. No.: 11/957,148

(22) Filed: Dec. 14, 2007

(65) Prior Publication Data
US 2008/0142711 A1 Jun. 19, 2008

Related U.S. Application Data

(60) Provisional application No. 60/870,077, filed on Dec. 14, 2006.

(51) Int. Cl.
*H01J 37/305* (2006.01)
*H01J 37/256* (2006.01)
*G01N 23/00* (2006.01)

(52) U.S. Cl. .............. 250/306; 250/307; 250/310; 250/396 R; 250/398; 250/492.2; 250/492.21; 438/14; 382/145

(58) Field of Classification Search ........... 250/306, 250/307, 310, 398, 396 R, 492.2, 492.21; 438/14; 382/145
See application file for complete search history.

(56) References Cited

U.S. PATENT DOCUMENTS

| | | | |
|---|---|---|---|
| 5,410,164 A | | 4/1995 | Katayama et al. |
| 6,211,527 B1 * | | 4/2001 | Chandler ............... 250/492.2 |
| 7,115,426 B2 * | | 10/2006 | Le Roy et al. ............ 438/16 |
| 7,208,724 B2 * | | 4/2007 | Moore et al. ............. 250/234 |
| 7,348,556 B2 * | | 3/2008 | Chitturi et al. ........... 250/309 |
| 7,442,924 B2 * | | 10/2008 | Giannuzzi et al. ......... 250/307 |
| 2003/0102436 A1 | | 6/2003 | Benas-Sayag et al. |

FOREIGN PATENT DOCUMENTS

WO        WO 03/019238 A2        3/2003

OTHER PUBLICATIONS

Zimmerman, Gunnar et al., "Copper/low-k process characterization for 90nm technology using SEM and TEM imaging," Proceedings of 12th IPFA 2005, Singapore, © 2005 IEEE.
Khaled Karrai, et al., "Piezoelectric tip-sample distance control for near field optical microscopes", Applied Physics Letters, Apr. 3, 1995, pp. 1842-1844, vol. 66, Issue 14.
Khaled Karrai, et al., "Piezo-electric tuning fork tip-sample distance control for near field optical microscopes", Ultramicroscopy, Dec. 1995, pp. 197-205(9), vol. 61, No. 1.

* cited by examiner

*Primary Examiner*—Nikita Wells
(74) *Attorney, Agent, or Firm*—Joseph Bach, Esq.; Nixon Peabody LLP

(57) ABSTRACT

An analysis system has a charged particle beam instrument and a scanning probe microscope operably coupled with the charged particle beam instrument. A stage defines an aperture, the stage is adapted to support the sample over the aperture and finely move the sample at least along an X and Y axis, the aperture further situated in an operable area of the charged particle beam. The charged particle beam is used to mill the sample, while the scanning probe microscope is used to measure elements exposed by the milling.

24 Claims, 4 Drawing Sheets

FIG. 1A (Revised)

US 7,842,920 B2

METHODS AND SYSTEMS OF PERFORMING DEVICE FAILURE ANALYSIS, ELECTRICAL CHARACTERIZATION AND PHYSICAL CHARACTERIZATION

RELATED APPLICATIONS

This Application claims priority from U.S. Provisional application Ser. No. 60/870,077, filed Dec. 14, 2006, which is incorporated herein by reference.

FIELD OF THE INVENTION

Aspects of the present invention involve a method and system for performing device or other structure physical or electrical characterization analysis as well as failure analysis and critical dimension analysis, depending on the device or structure being analyzed. More particularly, one aspect of the present invention involves analysis of a sample, such as an integrated circuit, using a focused ion beam ("FIB") in conjunction with a scanning probe microscope ("SPM").

BACKGROUND

A newly-designed integrated circuit ("IC") is typically fabricated over a process, involving preparation of silicon substrate wafers, generation of masks, doping of the silicon substrate, deposition of metal layers, and so on. The IC typically has many physical layers on this substrate with various individual electronic components, such as resistors, capacitors, diodes, and transistors, collectively forming one or more electrical circuits. The metal layers, which may be aluminum, copper, or other conductive material, provide the interconnection mesh between the various individual electronic components to form integrated electrical circuits. Vias formed of electrically conductive material provide communication pathways between various metal layers. Contacts provide communication links between metal layers and individual electronic components embedded in the silicon substrate. The metal layers as expected must be placed very precisely and their thicknesses must be controlled. Various monitoring tools are employed to make the CD ("critical dimension") measurements during the fabrication of the IC. The goal being a flawless (within acceptable tolerances for that process) execution of the fabrication process.

Unfortunately, a new complex IC rarely works as expected when first fabricated. Normally, some defects in the operation of the IC are discovered during testing. Also, some functions of the IC may only operate properly under limited conditions, but fail when operated across a full range of temperatures, frequencies and voltages in which the IC is expected to perform. Once the IC has been tested, the designer may need to change the design, initiate the manufacture of a second prototype IC via the lengthy process described above, and then test this new IC. However, no guarantee exists that the design changes will correct the problems previously encountered, or that all of the problems in the previous version of the IC have been discovered. Sometimes a failure is due to the design, the process, and the interaction of the process with the specifics of the design layout. Often times a cross section of the devices vertical and horizontal structure is required during fabrication or after to learn what the problem is and why.

Charged particle beam systems, such as focused ion beam ("FIB") systems and electron beam ("e-beam") systems, laser based systems, and other integrated circuit operation platforms have found many applications in various areas of science and industry. Particularly in the semiconductor industry, charged particle beam systems are used for integrated circuit edits, probe point creation, failure analysis, and numerous other applications including cross section analysis. More generally, servicing platforms may be used for testing, analyzing, editing, and/or repairing an IC. For example, charged particle beam systems may be used to edit a circuit ("circuit editing") in order to validate design changes and thereby avoid some or all of the expense of validating design changes through fabrication. Particularly, a FIB instrument typically includes a particle beam production column designed to precisely focus an ion beam on the IC at the place intended for the desired intervention. Such a column typically comprises a source of ions, such as Ga+ (Gallium), produced from liquid metal. The Ga+ is used to form the ion beam, which is focused on the IC by a focusing device comprising a certain number of electrodes operating at determined potentials so as to form an electrostatic lens system. Other types of charged particle beam systems deploy other arrangements to produce charged particle beams capable of various types of circuit edits and operations generally. Further, laser-based systems deploy various types of lasers for purposes of laser based circuit editing. FIB systems also may include co-axial photon-ion columns as described with respect to U.S. Patent Application US 20030102436 titled "Column Simultaneously Focusing a Particle Beam and an Optical Beam," which is hereby incorporated by reference herein.

As mentioned above, IC manufacturers sometimes employ a FIB system to make CD measurements or conduct a failure analysis on a prototype IC. CD measurements and failure analysis in these cases provide detailed information about the physical characteristics of structures at sub-process dimensions, some times near the atomic level. Typically, the CD measurements and failure analysis is performed using a FIB instrument in conjunction with Scanning Electron Microscope ("SEM") imaging. The FIB removes device material to form a trench (cross section trench) at a specific area of interest predetermined by statistical requirements of CD measurements or by electrical failure localization techniques. The orientation of the face of the trench would be predetermined also. SEM imaging requires this milled trench and polishing of only one side of a target cross section. The differences between a CD measurement tool and a FIB based physical failure analysis tool are the samples being analyzed. Generally, the CD measurement tool is used to examine structures on wafers whereas the failure analysis tool is used to examine discrete die. However, the CD tool can examine discrete die when properly mounted and the failure analysis tool can examine wafer pieces which are small enough to be mounted.

SEM imaging provides structural information on a selected area, which is used to identify potential failures in the prototype IC. The spatial resolution of the SEM, however, is limited by the size of the electron spot, which is dependent on the magnetic electron-optical system, which produces the scanning beam as well as on the energy of the electron probe. The resolution is also limited by the size of the interaction volume, or the extent of material, which interacts with the electron beam. This process requires extensive milling and layer thinning to get adequate image resolutions and may become impractical for structures smaller than the 45 nm process.

For imaging when SEM is insufficient to yield a desired resolution, a device processed with a FIB is imaged with a Scanning Transmission Electron Microscope (STEM) or a Transmission Electron Microscope (TEM). TEM imaging of a sample prepared with an FIB instrument as well as a comparison to SEM imaging is discussed in "Copper/low-K Process Characterization for 90NM Technology Using SEM and TEM Imaging," Zimmerman et al., Proceedings of $12^{th}$ IPFA 2005, Singapore (2005), which is hereby incorporated by reference herein. STEMs and TEMs involve imaging techniques whereby a beam of electrons are focused onto a specimen causing an enlarged version to appear on an energy sensitive imaging detector such as a fluorescent screen or layer of photographic film or digital camera. Preparation of a sample for STEM or TEM imaging requires extensive milling and cross sectional thinning to get adequate image resolution, which is time consuming.

Particularly for TEM or STEM imaging, the sample being scanned must be very thin, on the order of 100 nm. As such, to image a cross section of an IC, a cross section trench must be milled and polished on either side of the target section. The milling and polishing of such a thin sample region often results in partial or complete destruction of the sample region. SEM imaging requires a trench and polishing of only one side of a target cross section; thus, preparation of a sample for TEM or STEM imaging has the greater potential for failure compared with preparation for SEM imaging.

Therefore, there is a growing need in the art for CD measurement and failure analysis methods that are practical in providing information more rapidly and yet produces adequate images and data from IC structures of interest.

SUMMARY

According to an aspect of the invention, a method of analyzing a sample using a charged particle beam column defining a charged particle beam axis and an in situ scanning probe microscope is provided, comprising: positioning the sample so that a site of interest is positioned within a operable area of the charged particle beam; operating a charged particle beam column so as to mill a sectional area of the site of interest; and operating the scanning probe microscope so as to image the exposed sectional area of the site of interest. The method may further comprise tilting the sample so a sectional area of the site of interest is angularly oriented with respect to the charged particle beam axis. The operation of tilting the sample may further comprise tilting the sample so that the site of interest is angularly oriented about zero to ten degrees with respect to the charged particle beam axis. The operation of charged particle beam milling the sectional area of the site of interest may further comprise defining a trench in the sample having at least one substantially vertical side wall. The sample may comprise an integrated circuit wherein the operation of milling comprises milling from a backside of the integrated circuit. The method may further comprise marking the target prior to milling. The method may further comprise polishing the sectional area of the site of interest. The method may further comprise terminating the polishing operation within the site of interest. The method may further comprise electrically measuring a signal from a feature in the sectional area of the site of interest. The sectional area of the site of interest may be simultaneously positioned by secondary electron imaging with the focused ion beam column for scanning probe access according to a charged particle beam milling pattern.

According to an aspect of the invention, an analysis system is provided, comprising: a charged particle beam instrument defining a charged particle beam axis; a scanning probe microscope operably coupled with the charged particle beam instrument; and a stage defining an aperture, the stage adapted to support the sample over the aperture and finely move the sample at least along an X, Y axis, the aperture further situated in an operable area of the charged particle beam. The charged particle beam instrument may comprise a focused ion beam instrument. The focused ion beam tool may further comprise an optical imaging instrument. The scanning probe microscope may comprise a probe tip supported on a probe stage. The analysis system may further comprise a controller correlating the probe stage to the focused ion beam column. The stage may comprise a sample stage and a probe stage.

According to an aspect of the invention, an analysis system is provided, comprising: a charged particle beam instrument defining a charged particle beam axis; a scanning probe microscope operably coupled with the charged particle beam instrument; and a stage defining an aperture, the stage adapted to support the sample over the aperture and finely move the sample at least along an X, Y and rotational axis, the aperture further situated in an operable area of the charged particle beam. The charged particle beam instrument may comprise a focused ion beam instrument. The focused ion beam tool may comprise an optical imaging instrument. The charged particle beam instrument may comprise a focused ion beam column and optical imaging system. The stage may comprise a sample stage and a probe stage. The analysis system may further comprise a controller referencing the probe stage to the charged particle beam instrument. The scanning probe microscope may comprise a tuning fork probe.

BRIEF DESCRIPTION OF THE DRAWINGS

FIG. 1A is a representative section view of a nanoscopic imaging instrument integrating a focused ion beam column with a scanning probe microscope, a probe portion of the scanning probe microscope is shown out of the path of the ion beam which impacts the silicon device perpendicular to its surface, in accordance with one embodiment conforming to aspects of the present invention;

DETAILED DESCRIPTION OF EMBODIMENTS OF THE INVENTION

Aspects of the present invention involve the combination and/or integration of a charged particle beam instrument, such as a FIB, with a scanning probe microscope ("SPM") and/or SPM imaging techniques. Aspects of the invention further involve a method for SPM imaging of a target area of a sample, such as an IC, that is first prepared with a FIB instrument and then imaged with the SPM. The target area may include some region of the sample, such as particular doping regions of an IC (e.g., n-wells and p-wells associated with transistor structures), metal layers, vias (interconnections between metal layers), contacts, etc. Preparation of the sample may first involve processing the sample with the charged particle beam instrument, such as milling a trench in the IC using a FIB in order to expose the target area and then polishing the target area. After processing the sample with the charged particle beam instrument, SPM imaging techniques are used to generate an image of the target area. One particular aspect of the invention involves FIB milling a cross section of an IC and imaging the cross section with the SPM.

Various embodiments and methods conforming to aspects of the present invention are discussed herein with reference to charged particle beam processing of and SPM imaging of an integrated circuit, or some portion thereof. As used herein, however, the term "sample" refers to an integrated circuit structure or other processing arrangement, whether employing silicon or other semiconducting base materials or partially or completely employing biochemical structures, nanostructures, and other nanotechnology based fabrications, molecules, polymers, ceramics, and any other structure or compound or portion thereof that may be processed with a charged particle beam and imaged by way of SPM imaging techniques.

The term "scanning probe microscope" or "SPM," as used herein, generally refers to a class of imaging technologies and related imaging methodologies including, but not limited to, atomic force microscopy ("AFM"), magnetic force microscopy ("MFM"), scanning capacitance microscopy ("SCM"), near-field scanning optical microscopy ("NSOM"), electrical force microscopy ("EFM") and other like nanoscopic imaging technologies and methods. Generally, SPM involves the use of an SPM imaging instrument configured to perform one of the above-referenced techniques or one considered generally as an SPM imaging technique in order to study and generate images of nanoscopic, atomic, and other exceedingly small properties of structures, materials, compounds, whether man-made or naturally occurring.

Figures 1B, 2:
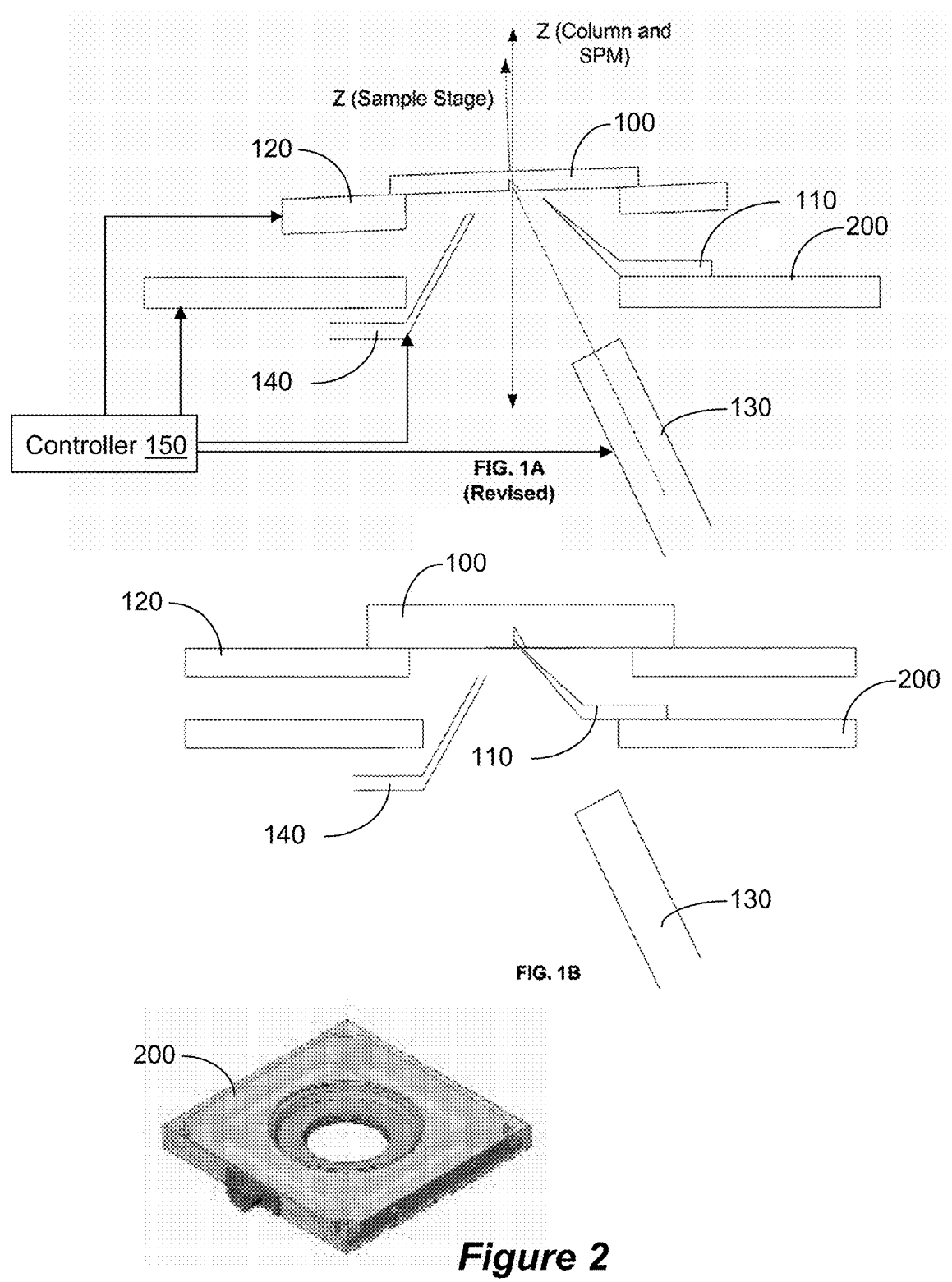
FIG. 1B is a representative section view of the nanoscopic imaging instrument of FIG. 1A, the probe portion moved adjacent a target region of a sample, in accordance with one embodiment conforming to aspects of the present invention.
FIG. 2 is an isometric view of a probe stage, in accordance with one embodiment conforming to aspects of the present invention.

Referring to FIGS. 1A and 1B, the integrated nanoscopic analysis instrument includes a focused ion beam column 130. The column 130 includes ion beam components and may include optical imaging components. The FIB column 130 may incorporate a photon column including ion beam and optical imaging components arranged so that the ion beam and optical imaging axes are coaxial. The open aperture defines a z-axis of the probe stage, which is also the z-axis of the instrument, arranged along the center axis of the aperture, in one particular arrangement. Further, in one particular configuration, there is a possible tilt of ~5 (2-8 degree range) degrees angular orientation of the sample axis with respect to the z-axis of the scanning stage and FIB beam. The tilt is provided to account for or offset the typically converging walls of a FIB milled trench (See FIG. 4A). Stated another way, the side walls of a FIB milled trench are not vertical, tilting the sample allows the section wall of interest to be nearly vertical or vertical, which assists in proper critical dimension (CD) feature exposure for the probe placement over the section. The tilt is such as to reduce the lack of orthogonality of the FIB etched face to the surface of the IC.

Still referring to FIGS. 1A and 1B, one particular nanoscopic imaging instrument further includes a sample stage 120, which may be rotatable. Alternatively, the probe scanning stage of the instrument may be configured for rotation about the sample stage. In any event, rotational movement of the sample or other portion of the instrument allows for rotational positioning of the sample to optimize the location of the sample with respect to the FIB and/or the probe axis for purposes of cross section or other milling, imaging, and probe placement. The nanoscopic imaging instrument further includes a chemistry injection port 140 arranged to provide various chemical formulations in the area of the sample during various focused ion beam procedures. For example, $XeF_2$ is introduced into the sample region during focused ion beam trenching of silicon, which is a preparation step when the analysis is to be accomplished from the silicon side of the IC. Further chemistries can be used to "decorate" the cross section face so as to enhance the critical components on the face such as metallizations, dielectric layers, dopants and dopant densities.

As mentioned above, the SPM portion of the nanoscopic imaging instrument includes the probe 110. The probe 110 may be operably supported on a separate probe stage 200, illustrated in FIG. 2. The probe is supported for X, Y, and Z movement. The probe stage is always referenced to the ion column as not only does the ion column reveals the structures the probe is to analyze but also the ion column by its own imaging capability enables faster probe placement than would be the case if the probe relied on its own sensing; which would be like a blind man using a cane—he can get around but not quickly. FIG. 1A shows the probe 110, supported on the probe stage 200, positioned away from the ion beam axis, which is the position of the probe during milling so that the ion beam does not damage the probe. Momentary imaging of the probe by the ion beam has been shown not to be detrimental. FIG. 1B illustrates the probe 110 positioned for imaging the face of a side wall (e.g. section) of a cross section trench milled in the sample supported on the sample stage. The probe 110 is the portion of an SPM instrument that interacts with the sample to collect information to generate an SPM image. Generally, the probe is scanned, rastered, or otherwise moved across the sample. The probe detects information concerning the sample and the SPM instrument converts the information into an image. For example, in the case identified here, the probe includes a tip supported in a tuning fork arrangement (such as is sold by Nanonics Imaging Ltd.). The tip may be arranged to contact the surface, be held a constant distance above the surface, or other arrangements are also possible. The tuning fork type probe evidences a resonant frequency change in the presence of different atomic structures. Forces between the tip and sample deflect or attract the probe tip altering its resonant frequency, and the force of deflection or attraction may be used to generate an image of the structures causing the deflection—a topographic image of the surface based on deflections, etc. In another embodiment, the probe may include multiple tips to speed-up the measurement.

One particular implementation of a nanoscopic imaging instrument when used with the photon-ion column includes an SPM instrument portion configured to operate with two types of probes, cantilever type and tuning fork type, which may be employed alone or in combination. Generally, either probe, as introduced above, includes a tip that is passed over a target sample. A cantilever type probe uses reflected laser light to measure the perturbation in the probe tip due to proximity of surface atoms on a sample. With either probe, measurement of changing probe characteristics, e.g., perturbation and vibration, typically in a feed back loop, yields information concerning the atomic structures at the location of the tip. Examples of cantilever and tuning fork-type probe tips that may be employed in embodiments conforming to the present invention are described in U.S. Pat. No. 6,396,966 titled "Glass Structures for Nanodelivery and Nanosensing," which is hereby incorporated by reference herein. Examples of cantilever and tuning fork sensing arrangements that may be employed in embodiments conforming to the present invention are described in International Application No. PCT/US02/25947 (WO 03/019238) titled "Multiple Plate Tip or Sample Scanning Reconfigurable Scanned Probe Microscope with Transparent Interfacing or Far Field Optical Microscopes," which is hereby incorporated by reference herein.

When SPM imaging an integrated circuit, P-type, N-type, metal, silicon, silicide, and other areas of the IC may be identified by way of identifying their atomic/molecular properties such as electrical conductivity, thermal conductivity, capacitance, optical near-field properties, etc. The images created by SPMs may be at a higher resolution compared to images created by some SEMs, TEMs or STEMs. As such, combining FIB techniques with SPM techniques to analyze a sample may yield higher resolution of sample features then prior art techniques. Further, aspects of the invention employing SPM techniques may be employed to measure electrical waveforms such as described in U.S. Pat. No. 5,959,458 titled "Method and Apparatus for Measuring Electrical Waveforms Using Atomic Force Microscopy" which is hereby incorporated by reference herein. Resistivity and thermal conductivity may be related to doping levels in the active regions of transistors within the IC.

In order to integrate charged particle beam systems, such as a FIB, with a SPM system, the ion beam path to the sample should be unobscured. Further, the SPM probes should have access to the sample. U.S. Pat. No. 5,705,878 titled "Flat Scanning Stage for Scanned Probe Microscope," which is hereby incorporated by reference herein, describes a scanning stage arrangement for supporting and moving the probes in the X, Y, and Z planes in order to manipulate a sample mounted on the stage and/or manipulate a probe for scanning of the sample. The scanning stage arrangement further provides a centralized open aperture (See FIG. 2) that may be arranged such that the ion beam path passes through the aperture. As such, the SPM scanning stage and associated probing arrangement may be employed or integrated with a charged particle beam system. In one embodiment, the tuning fork has tapered cantilevered optical fibers that have a probe tip that does not substantially obscure the electron/ion beam.

One particular FIB instrument that may be employed in embodiments conforming to the present invention is a dual column FIB instrument, such as described in U.S. patent application Ser. No. 10/239,293 (U.S. Pub. No. US 2003/0102436) titled "Column Simultaneously Focusing a Particle Beam and an Optical Beam," which is hereby incorporated by reference herein. The FIB instrument described in the above-referenced application provides an optical beam for optical imaging and an ion beam for charged particle beam processing of a sample. The optical beam is substantially coaxial with the FIB beam, in some implementations. A commercially available FIB instrument conforming to aspects of the above-referenced application is the Credence OptiFIB™ focused ion beam instrument. Employed with an SPM instrument employing a probe stage as discussed above, both the imaging beam and ion beam of the FIB instrument may be directed through the open aperture, thus providing a platform for an integrated nanoscopic imaging instrument that includes charged particle processing, optical imaging, and SPM imaging capabilities. Although some embodiments of the invention might benefit from a dual column FIB arrangement, a single column FIB instrument (one without integrated imaging optics) may also be employed in embodiments conforming to the present invention.

It should be noted that collection of secondary electrons generated from an ion beam incident on a target sample may be collected in order to perform secondary electron imaging. As such, some embodiments of the present invention may provide several different imaging or sample data collection modes, including optical, SPM, and secondary electrons. One possible arrangement for secondary electron collection and imaging is described in U.S. Publication No. 2006-0006329, titled "Charged Particle Guide," filed on Jul. 9, 2004, which is hereby incorporated by reference herein.

The sample 100 may be supported on a movable stage 120 of the FIB instrument and the probe 110 supported on a scanning stage 200 of the SPM instrument. The sample 100 may be moved in the X,Y and/or Z planes depending on any particular arrangement. Moreover, the sample may be rotated, or other relative rotational orientation achieved. Additionally, the sample 100 may be tilted or the optical and ion beam axis may be arranged at an angle with respect to the SPM axis, for sample preparation, such as milling a cross section trench. A user will move the sample in order to arrange it for FIB processing in order to expose a target region and subsequent SPM imaging of the target region. The optical imaging capabilities of the OptiFIB™ arrangement because it "sees" through silicon and dielectric materials, allow for more precise navigation of the sample to arrange the sample for FIB processing.

Figure 3:
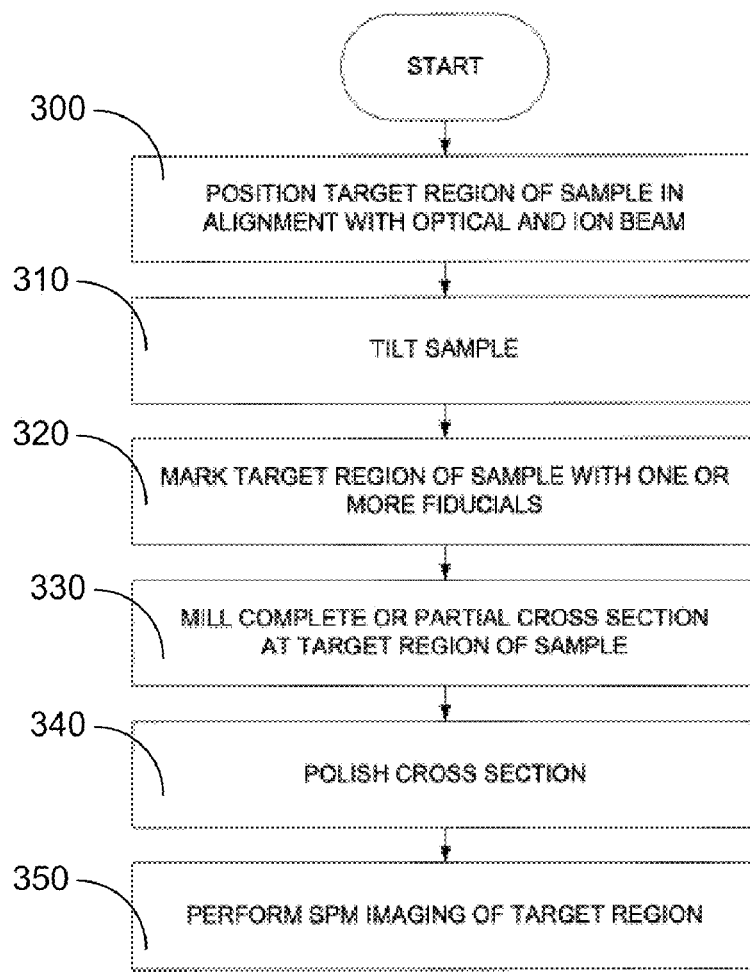
FIG. 3 is a flowchart illustrating one particular method of nanoscopic imaging conforming to aspects of the present invention; Note: Optical imaging is not necessary for positioning.
Figure 4:
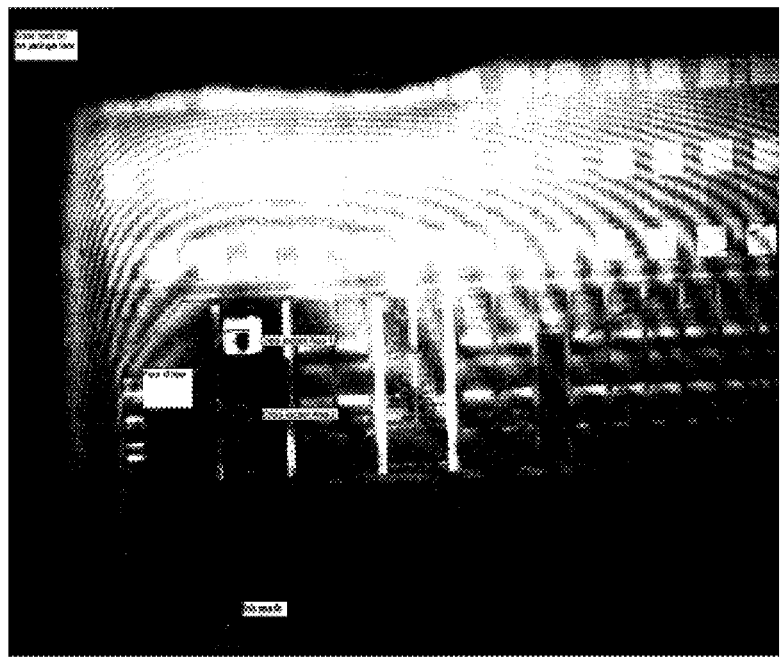
FIG. 4 is a backside light microscope plan-view image of a region of a sample integrated circuit that may be nanoscopically imaged in accordance with apparatus and methods conforming to various embodiments of the present invention.

One method for performing CD measurements and failure analysis with a charged particle beam system and SPM system is illustrated in FIG. 3. To begin, a target region of a sample is positioned in alignment with the ion beam axis (operation 300). In one possible implementation, the sample stage 120 needs to move less than approximately +/−25 mm to locate the feature of interest. The scanning probe stage 200 needs to move approximately +/−25 um plus whatever it takes the SPM stage to get the probe out of the ion beam milling area. In the case of an integrated circuit, it is possible to align the integrated circuit by way of computer aided design layout or other circuit layout information. In an instrument including integrated optical components, imaging may also be used for alignment. The sample 100 may be placed on the stage 120 with either the front side or back side of the IC exposed to the ion beams. In one particular implementation, the sample 100 is placed on the stage for backside processing. FIG. 4 illustrates a backside image of a portion of an integrated circuit. In the example of FIG. 4, the silicon substrate of the integrated circuit has been thinned in order to allow some imaging of interconnections or other structures within the integrated circuit. FIG. 4 further illustrates a target for milling an area cross section of the integrated circuit. As will be discussed in further detail below, the focused ion beam aspect of the nanoscopic imaging instrument is used to create a trench in the backside silicon by which sectional imaging of the sample may be undertaken. X, Y, Z, rotational and/or tilting of the sample stage allows the trench to be created along any plane of the sample as well as any orientation of the sample. Tilting and rotation further provide a way to position the sample with respect to the probe, as discussed in greater detail below.

Once the sample is properly located with respect to the focused ion beam axis, the sample is tilted about five degrees (could be as much as 8 degrees or as little as 2 degrees with respect to the ion beam axis (operation 310). When the sample is first placed on the stage, the optical axis is generally perpendicular to the backside plane of the sample. Tilting the sample allows the trench to be created with a substantially vertical face. In one arrangement, the trench walls are oriented about 90° with regard to the backside plane of the sample due to tilting the sample to offset milling effects. Typically, a FIB mills a trench in an IC with side walls having about a 3-5° angle, i.e., the trench opening is wider than the trench floor and the side walls are tapered inward between the opening and the floor about 3-5°. When large beam currents are used this angle can be much more or when fine specially focused beams are used it can be less; generally however, a good focus beam is used which gives the 3-5 degree effect. Alternatively, the ion beam axis is arranged at some angular orientation with respect to the Z-axis of the probe stage, as discussed above. Such an arrangement may eliminate considerations with respect to tilting the sample.

Figure 5A:
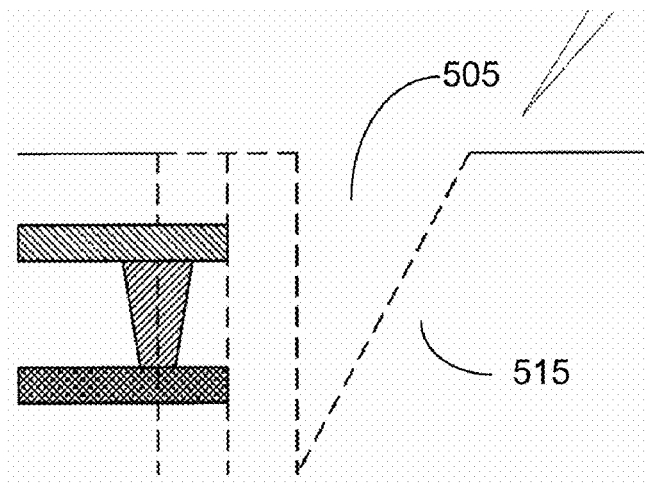
FIG. 5A is a representative section view of a target area of an integrated circuit with a trench formed adjacent the target area in preparation for scanning probe microscope imaging, in accordance with aspects of the present invention.
Figure 5B:
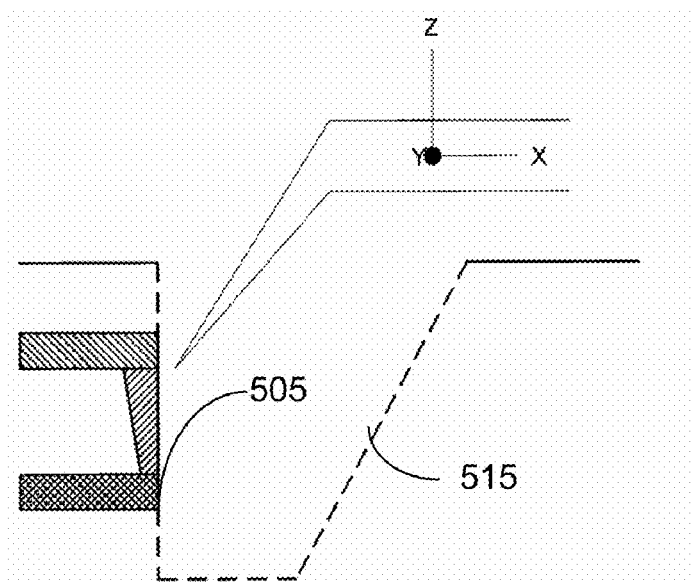
FIG. 5B is the representative section view of the target area of the integrated circuit of FIG. 5A, with trench further formed through polishing adjacent the target area and with a probe positioned within the trench for scanning probe microscope imaging of the target area, in accordance with aspects of the present invention.

FIGS. 5A and 5B are representative cross section views of a portion of an integrated circuit being processed in accordance with methods described herein. Particularly, it can be seen that a trench is created next to a particular target feature of the sample intended for SPM imaging. The trench includes a wall 505 that is substantially perpendicular to the outer surface of the sample (the cross section face). The trench further includes a second wall 515 (back wall) that is angularly offset from the backside face of the sample. As such, the trench defines a vertex at its bottom and divergent side walls above the vertex. It is possible to prepare a substantially vertical second wall 515 but the trench is prepared faster when the back wall is not vertical. This does not have to be but the trench is prepared faster when the back wall 515 does not need to be vertical. Tilting the sample facilitates milling the substantially vertical face of the trench. Alternatively, an instrument incorporating both a focused ion beam instrument with an SPM instrument has the focused ion beam axis angularly offset from the SPM axis such that sample tilting is not required At some point while orienting the sample, it is marked with one or more fiducials (operation 320). (This step could come before the tilting.) Fiducial marking allows for the feature of interest to be located even after the IC surface is altered by deposition and the trenching process. A protective deposited coating may also be applied to the sample before milling starts. A coating, such as a platinum, or tungsten based compound or other material even carbon, may be deposited over the target area (where milling will occur) to protect the top surface from damage during FIB milling. The metal coating may be deposited with the FIB tool by injecting the appropriate chemical into the target area. Using very low energy (5-7 keV) deposition techniques minimizes surface amorphorization. The metal may also be deposited by other means. The presence of a protective coating can reduce unwanted material removal adjacent the trench resulting in a sharp edge at the trench substrate boundary. The protective coating can also cause the FIB beam to produce a flatter cross section face than is produced in the absence of the coating. In the absence of a protective coating, the edges at the trench opening and at the trench wall/floor boundary tend to be rounded, which can reduce SPM and optical imaging quality during analysis phases of later processing.

Once properly oriented with respect to the focused beam axis, a cross sectional area of the sample is milled with the focused ion beam (operation 330). Typically, the focused ion beam is energized and directed on a portion of the sample. Through rastering the ion beam, proper dimensions of the cross section are achieved. Generally, rastering refers to movement of the ion beam in a grid like pattern about a portion of the sample. The ion beam is typically energized for some time at each point within the grid. One particular rastering arrangement that may be employed in some embodiments and methods conforming to the present invention is described in U.S. Publication 2006-0043312, titled "Enhanced Scanning Control of Charged Particle Beam Systems," filed Aug. 31, 2004, which is hereby incorporated by reference herein. The cross section may not be a complete cross section of the device, i.e., the cross section may not completely penetrate between the front side and the backside of the silicon, rather the cross section only exposes a specific cross sectional area of the integrated circuit as is needed.

Referring again to FIG. 5A, a cross section is milled adjacent a target region of an IC sample. In this example, the cross section is milled in the backside of the sample. The trench defines a first side wall (cross section face) generally perpendicular with the backside surface of the sample. The first side wall is adjacent the target structure. The trench further defines a second side wall (back wall). The first side wall and second side wall intersect at a vertex. Above the vertex the side walls diverge. Initially ion beam milling, in one particular method, does not penetrate into contact with the target region of the sample.

After initial milling is complete, the face is polished (operation 340). FIGS. 5B (side view) and 5C (top view) illustrate the cross sectional area after polishing. Polishing the face removes some material including material that has been deposited on it from the back, the bottom and the other side walls, but in a way that typically creates less imaging artifacts than simply milling the entire trench. The quality of the polishing is reflected in the quality of the scanning probe image obtained. The side wall is polished until at least some of the material within a target area is exposed in the trench face.

In one particular implementation, polishing may occur in several steps. Generally, polishing begins at some point away from the site of interest. While polishing is being performed, the trench side wall moves toward the site of interest, and may proceed to contact components within the target area. The first polishing steps, away from the target area, may be of a lesser quality than the final polishing steps, as the face moves into the target area. In one particular implementation, a high quality polish is provided at the target area. In the example of FIG. 5B, the polishing operations are concluded when the side wall has penetrated to approximately the center of the via. It is possible to perform SPM imaging at various stages of the polishing operation in order to obtain images at various sections through the target area and thus with some computer manipulation of the data do some tomography of the region of interest so as to obtain 3-D renderings of this area of interest as well as derivatives from the 3-D rendering. Polishing may be performed by FIB based polishing methods.

Figure 5C:
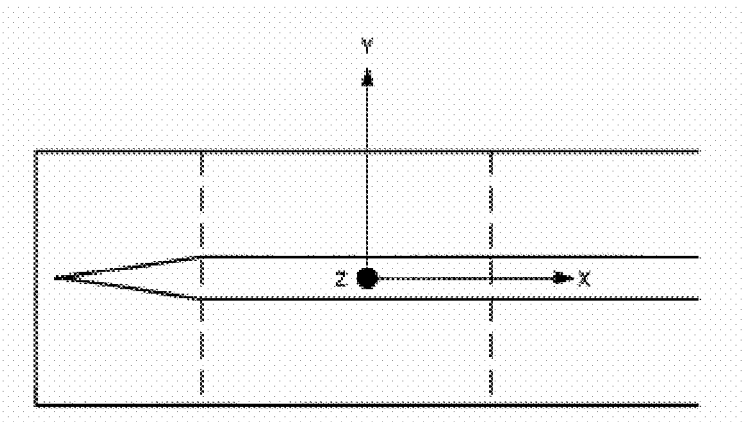
FIG. 5C is a bottom view of the structures illustrated in FIG. 4.
Figure 6:
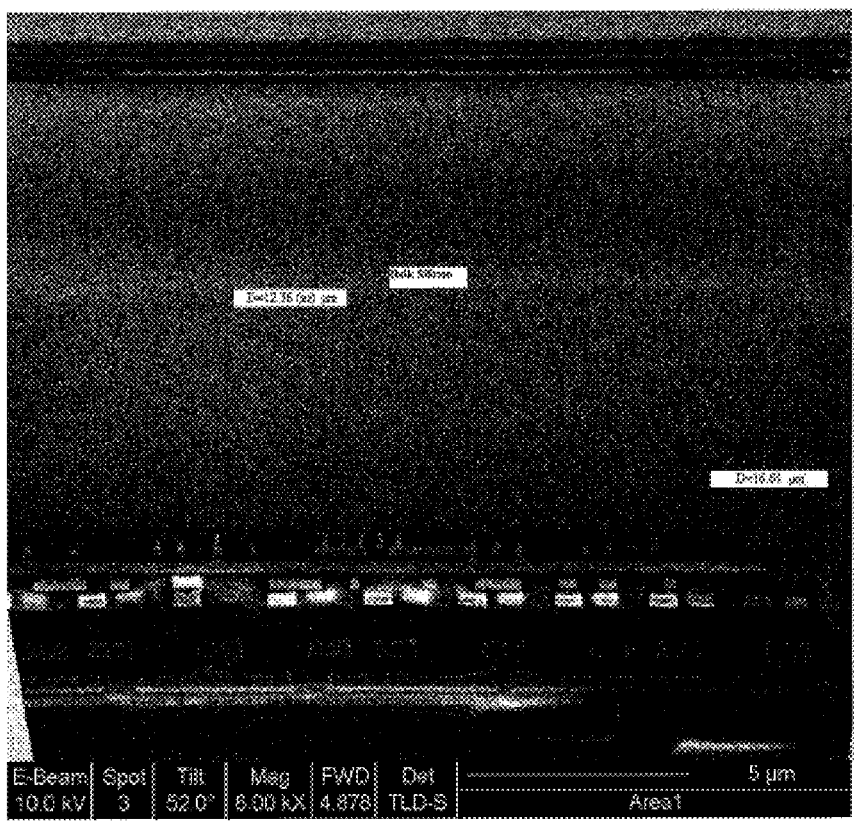
FIG. 6 is a SEM section view image of a target cross sectional area identified in FIG. 3.
Figure 7:
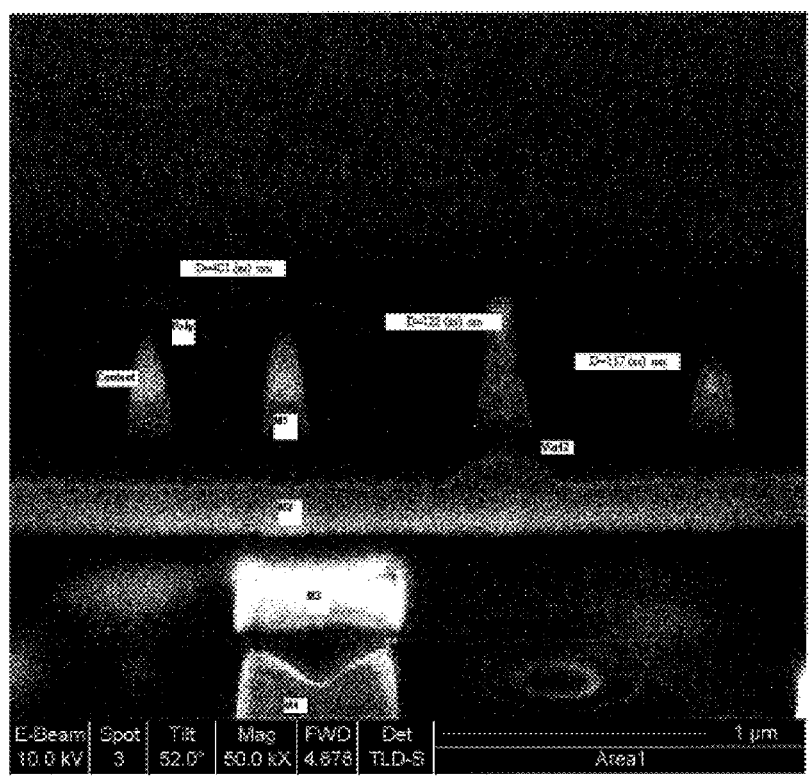
FIG. 7 is a close up SEM section view image of a portion of the section view of FIG. 5.

FIG. 6 is a scanning electronic microscopic image, not SPM image, of the cross sectional area related to the cross section area identified in FIG. 4, and for reference in the discussion. FIG. 6 illustrates the back side silicon and several metal layers, polysilicon, contacts and vias associated with various electrical components and metal interconnections of an integrated circuit. FIG. 7 is a close-up view of one particular portion of the cross section. Particularly, the cross sectional area includes metal 1, 2, 3 and 4 layers. The close-up view further illustrates a via interconnecting a portion of the metal 1 layer with the metal 2 layer. The representative diagram of FIGS. 5A-5C correspond with the via interconnecting the metal 1 and metal 2 layers.

As shown in FIGS. 1A and 5A, during milling of the cross section, the SPM tip is moved away from the focused ion beam so that the tip is not detrimentally eroded during the milling and cutting steps. When polishing has exposed some section of the target sample, the probe tip is moved into the trench and positioned adjacent or in contact with some portion of the target area, as shown in FIGS. 1B and 5B. The probe may then be rastered along the polished wall of the trench in order to image the sample area exposed therein. In one example, the AFM probe is moved from top to bottom (Z and Y) along the trench wall. The probe may, however, be moved sideways, from bottom to top (Y and Z), or in any other pattern. As shown in FIGS. 5A and 5C, the sample is positioned such that the probe tip may be positioned adjacent the site of interest. Rotation of the sample or probe, allows the proper side wall to be exposed to the imaging end of the probe. The FIB raster milling pattern determines the cross section face-to-view. So this simplifies the set-up for both the milling and the viewing.

The desired site is imaged with the SPM (operation 350). The image of the desired site will typically be of higher quality when the cross section is initiated from the silicon backside as the cross section artifacts will not be as prominent. Due to the high resolution of the SPM portion of the tool, it is also possible to analyze doping profiles of diffusion and well regions.

Other features of the invention include the SPM scanning in y and z instead of the general x and y, which is not generally possible with canter-lever SPMs. The SPM probe may be the tuning fork type so as to move within the V-shaped FIB cross section trench. The measurement method may include sequentially polishing and imaging with the SPM so as to enable a 3-D image through processing the imaging data at the various remaining thicknesses of the sample. The sequential imaging may be used to determine the best point (endpoint) to the SPM analysis. Placement of the SPM is enabled by the FIB SE or optical imaging. Use FIB chemistries to accelerate the milling of the FIB cross section trench and/or to improve the planarity of the polished face of the FIB milled cross section. Use chemistries to delineate features on the polished face of the FIB milled cross section. Using low energy ion beam deposition during deposition of the protective layer to minimize top surface damage to the sample. Use low energy polishing to reduce damage on the face of the cross section. Use SPM tip for lift out when a STEM or TEM sample needs to be completed.

Another aspect of the present invention involves endpointing and generally detecting particular features of an integrated circuit. The term "endpointing" refers to determining when to stop the milling operation, which in this case is the polishing step at a certain depth in x (not z as is the case when editing) and may be performed by monitoring some signal from the operation that is dependent upon the composition of the material being milled. The SPM tip may be energized with a potential, which allows current flow from the tip when it contacts some portion of the integrated circuit. N-wells, p-wells, n-diffusions, and p-diffusions have different resistance. Thus, at a constant potential at the tip, current flow from the tip is dependent on the material that the tip contacts. Monitoring current flow may thus be employed in endpointing or to determine if the area of the IC that the SPM tip is contacting is the area to be analyzed.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

I claim:

1. A method of analyzing a sample using a charged particle beam column defining a charged particle beam axis and an in situ scanning probe microscope, comprising:
   positioning the sample so that a site of interest is positioned within a operable area of the charged particle beam;
   operating a charged particle beam column so as to mill a sectional area of the site of interest; and
   in situ operating the scanning probe microscope so as to image the exposed sectional area of the site of interest by scanning a probe tip over the sample to thereby produce a topographic image of the sectional area.

2. The method of claim 1 further comprising tilting the sample so a sectional area of the site of interest is angularly oriented with respect to the charged particle beam axis.

3. The method of claim 2, wherein the operation of tilting the sample further comprises tilting the sample so that the site of interest is angularly oriented about zero to ten degrees with respect to the charged particle beam axis.

4. The method of claim 3 wherein the operation of charged particle beam milling the sectional area of the site of interest further comprises defining a trench in the sample having at least one substantially vertical side wall.

5. The method of claim 1 wherein the sample comprises an integrated circuit and wherein the operation of milling comprises milling from a backside of the integrated circuit.

6. The method of claim 1 further comprising marking the target prior to milling.

7. The method of claim 1 further comprising polishing the sectional area of the site of interest.

8. The method of claim 1 further comprising electrically measuring a signal from a feature in the sectional area of the site of interest.

9. The method of claim 1 in which the sectional area of the site of interest is simultaneously positioned by secondary electron imaging with the focused ion beam column for scanning probe access according to a charged particle beam milling pattern.

10. The method of claim 1, wherein scanning the probe tip over the sample comprises arranging the probe tip to contact the sectional area.

11. The method of claim 1, wherein scanning the probe tip over the sample comprises arranging the probe tip to be held a constant distance above the sectional area.

12. An analysis system comprising:
a charged particle beam instrument defining a charged particle beam axis;
a scanning probe microscope operably coupled with the charged particle beam instrument, the scanning probe comprising a probe tip configured for scanning over exposed surface of a sample to thereby produce a topographic image of the exposed surface;
a stage defining an aperture, the stage adapted to support the sample over the aperture and finely move the sample at least along an X and Y axis, the aperture further situated in an operable area of the charged particle beam and the probe tip.

13. The analysis system of claim 12 wherein the charged particle beam instrument comprises a focused ion beam instrument.

14. The analysis system of claim 13 wherein the focused ion beam tool further comprises an optical imaging instrument.

15. The analysis system of claim 12 wherein the scanning probe microscope comprises a probe tip supported on a probe stage.

16. The analysis system of claim 15 further comprising a controller correlating the probe stage to the focused ion beam column.

17. The analysis system of claim 12 wherein the stage comprises a sample stage and a probe stage.

18. An analysis system comprising:
a charged particle beam instrument defining a charged particle beam axis;
a scanning probe microscope operably coupled with the charged particle beam instrument, the scanning probe microscope comprising a probe tip configured for scanning over exposed surface of a sample to thereby produce a topographic image of the exposed surface;
a stage defining an aperture, the stage adapted to support the sample over the aperture and finely move the sample at least along an X, Y and rotational axis, the aperture further situated in an operable area of the charged particle beam.

19. The analysis system of claim 18 wherein the charged particle beam instrument comprises a focused ion beam instrument.

20. The analysis system of claim 19 wherein the focused ion beam tool further comprises an optical imaging instrument.

21. The analysis system of claim 18 wherein the charged particle beam instrument comprises a focused ion beam column and optical imaging system.

22. The analysis system of claim 18 wherein the stage comprises a sample stage and a probe stage.

23. The analysis system of claim 22 further comprising a controller referencing the probe stage to the charged particle beam instrument.

24. The analysis system of claim 23 wherein the scanning probe microscope comprises a tuning fork probe.

* * * * *